United States Patent [19]
Okazaki et al.

[11] Patent Number: 4,918,884
[45] Date of Patent: Apr. 24, 1990

[54] DEPLOYABLE AND COLLAPSIBLE STRUCTURE

[75] Inventors: Kakuma Okazaki, Yokohama; Takayuki Kitamura, Yokosuka, both of Japan

[73] Assignee: Japan Aircraft Mfg. Co., Ltd., Yokohama, Japan

[21] Appl. No.: 272,215

[22] Filed: Nov. 14, 1988

[30] Foreign Application Priority Data

May 15, 1987 [JP] Japan .................. 62-117110
May 15, 1987 [JP] Japan .................. 62-71688
May 15, 1987 [JP] Japan .................. 62-71689

[51] Int. Cl.⁵ ................................. E04H 12/18
[52] U.S. Cl. ........................... 52/108; 52/646
[58] Field of Search ........... 52/108, 646; 267/69

[56] References Cited

U.S. PATENT DOCUMENTS

| | | | |
|---|---|---|---|
| 457,220 | 8/1891 | Schmidt | 267/69 |
| 519,995 | 5/1894 | Frisbee | 267/69 |
| 3,486,279 | 12/1969 | Webb | 52/108 |
| 4,334,391 | 6/1982 | Hedgepath et al. | 52/108 |
| 4,662,130 | 5/1987 | Miura et al. | 52/646 |

FOREIGN PATENT DOCUMENTS

| | | |
|---|---|---|
| 0106270 | 4/1984 | European Pat. Off. |
| 0209083 | 1/1987 | European Pat. Off. |
| 412437 | 5/1910 | France .................. 52/152 |

Primary Examiner—James L. Ridgill, Jr.
Attorney, Agent, or Firm—Frishauf, Holtz, Goodman & Woodward

[57] ABSTRACT

A structure comprising a pair of end plates, plural longerons arranged parallel to one another and elastically buckled, a plurality of radial spacers for holding these longerons at a certain interval and a pair of diagonal cords stretched between two adjacent radial spacers, between one of the end plates and the uppermost radial spacer and between the other of the end plates and the lowest radial spacer, respectively, wherein a means is attached to one of the paired diagonal cords stretched between one of the end plates and the uppermost or lowest radial spacer to apply a predetermined tension to this diagonal cord. The transforming of the longerons or radial spacer located at one end of the structure can be restrained by the tension applying means while the structure is being deployed or collapsed.

1 Claim, 11 Drawing Sheets

DEPLOYABLE AND COLLAPSIBLE STRUCTURE

BACKGROUND OF THE INVENTION

1. Field of the Invention

The present invention relates to a freely deployable and/or collapsible structure and more particularly, a deployable and/or collapsible structure for use with space stations and crafts wherein its characteristics exerted when it is being deployed and collapsed have been improved.

2. Description of the Related Art

Deployable structures are usually employed on space buildings such as the space stations. They occupy a small space when they are collapsed but they become long beam-like structures when they are deployed after they are launched into space.

Various structures of this type have previously been developed. One such structure comprises plural elastic and twistable longerons and a plurality of radial spacers. The present invention is based on this structure.

The fundamental arrangement of this conventional structure on which the present invention is based will be described with reference to FIGS. 1 through 3.

Figure 1:
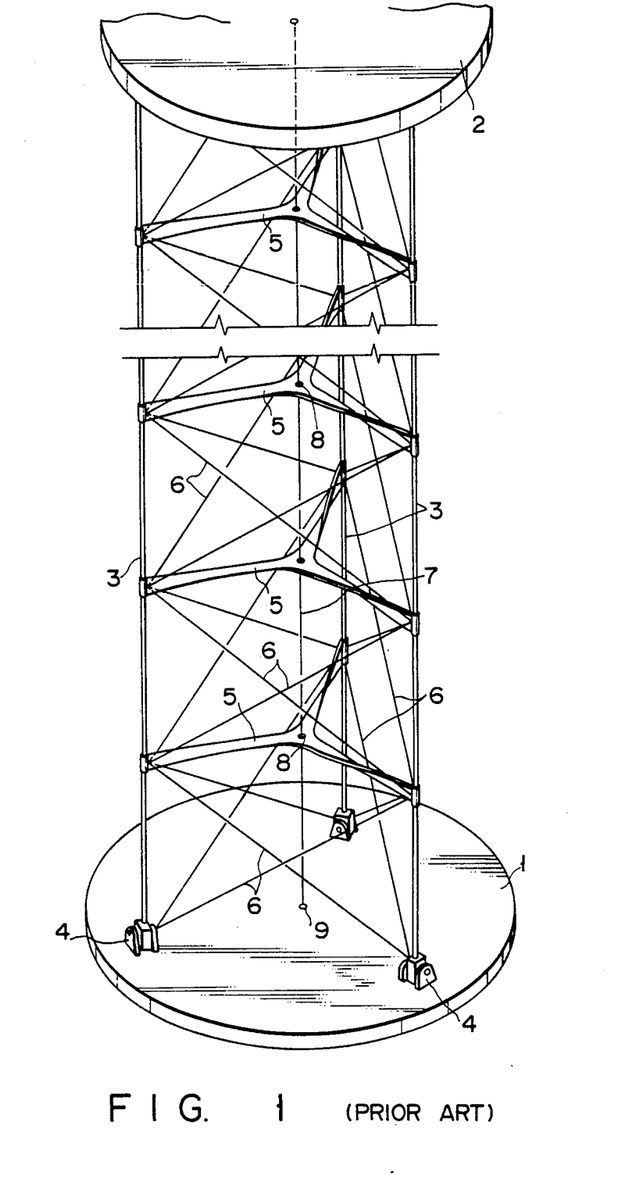
FIG. 1 is a perspective view showing the conventional deployable and/or collapsible structure deployed.

FIG. 1 shows the structure deployed. FIG. 2 shows the structure under such a transient condition that it is being deployed or collapsed. FIG. 3 shows the structure collapsed. Numerals 1 and 2 represent disk-like bottom and top plates. Plural or three longerons 3, parallel to one another and having a certain interval between adjacent ones, are arranged between these bottom and top plates 1 and 2. These longerons 3 are made of elastic material such as epoxy resin reinforced with glass or carbon fibers. They are shaped like a wire having a relatively small diameter and can be elastically twisted to a spiral having a certain diameter. Both ends of each longeron are attached to bottom and top plates 1 and 2 through hinges 4 and can be freely swung round hinges 4 in the peripheral direction of bottom and top plates 1 and 2, respectively.

These longerons 3 are connected to one another by a plurality of radial spacers 5 between bottom and top plates 1 and 2. These radial spacers 5 are made of elastically deformable material such as synthetic resin and each of them is shaped like a star which has plural or three arms corresponding to the number of longerons 3 used. These arms of star-like radial spacer 5 can be elastically twisted. Radial spacers 5 are arranged in the axial direction of longerons 3 at a certain interval and foremost ends of arms of each radial spacer 5 are attached to longerons 3, respectively, to hold the latter in such a way that they are located at certain positions or tips of a regular triangle. The truss-beam-like structure shown in FIG. 1 is thus made by these longerons 3 and radial spacers 5.

A pair of diagonal cords 6 is stretched between two adjacent longerons 3 and those foremost ends of four arms of two adjacent radial spacers 5 which are connected to these adjacent longerons 3. A pair of diagonal cords 6 are similarly stretched between the lowest radial spacer 5 and bottom plate 1 as well as between the uppermost radial spacer 5 and top plate 2. These diagonal cords 6 are made of fiber material having a high tensile strength and they are flexible. Torsion rigidity and strength and flexural rigidity and strength of the beam-like structure comprising longerons 3 and radial spacers 5 are enhanced by diagonal cords 6.

Pull cord 7 is arranged in the center of the structure. One end of this pull cord 7 is attached to the center of top plate 2, for example. Through-holes 8 are formed in the center of each of radial spacers 5 and through-hole 9 is formed in bottom plate 1. Pull cord 7 extends along the longitudinal center axis of the structure, passing through these through-holes 8 and 9. The other end of pull cord 7 is connected to a winding means (not shown) attached to bottom plate 1 and it is wound or re-wound by this winding means.

Figure 2:
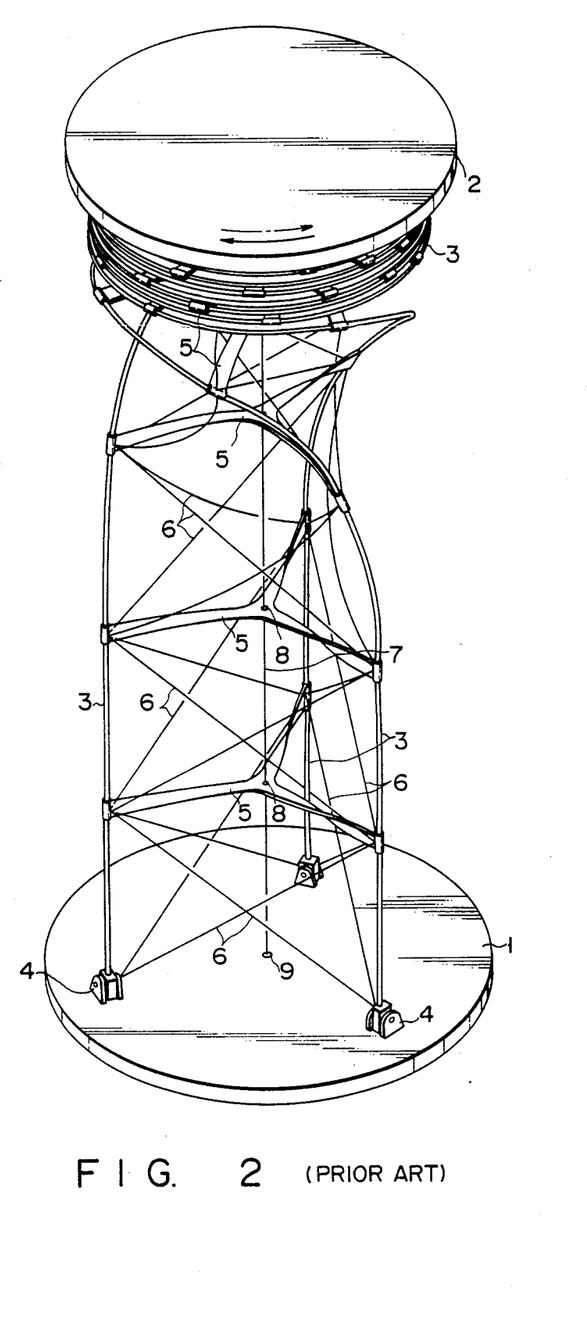
FIG. 2 is a perspective view showing the structure in FIG. 1 being deployed or collapsed.
Figure 3:
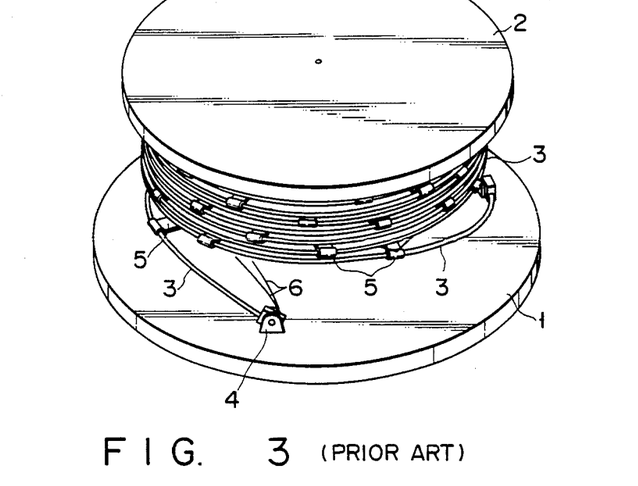
FIG. 3 is a perspective view showing the structure in FIG. 1 collapsed.

When pull cord 7 is wound by the winding means, top plate 2 is rotated and longerons 3 are twisted like a coil from their top successively as shown in FIG. 2 and the structure is finally collapsed as shown in FIG. 3. If pull cord 7 is re-wound when the structure is collapsed as shown in FIG. 3, longerons 3 will extend like a straight line due to their elasticity and the structure will become deployed as shown in FIG. 1.

This structure is used for space stations, for example. The structure which is kept collapsed as shown in FIG. 3 is launched into space and then deployed as shown in FIG. 1, re-winding pull cord 7, as a structure suitable for space stations.

When the conventional structures of this type were being designed, however, consideration was paid only to the case where they are deployed from their collapsed state and then used in the deployed state. But, it is sometimes needed being again collapsed after they are deployed in space. No consideration was paid, however, to this case where they are again collapsed after being deployed. In addition, little consideration was paid to their characteristics exerted when they are under such a transient condition that they are being deployed and collapsed.

Figure 4:
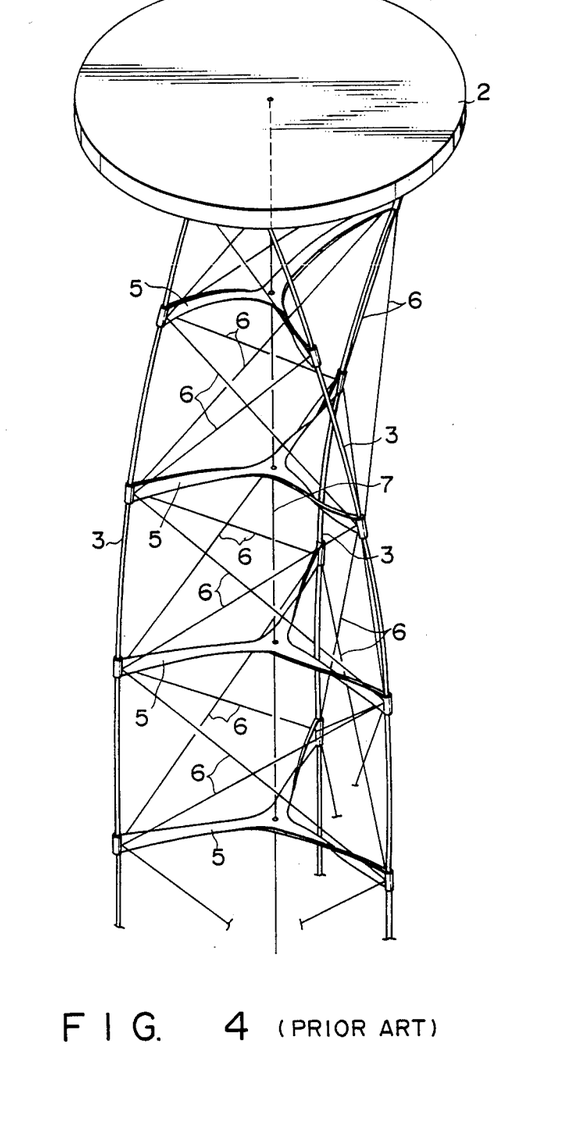
FIG. 4 is a perspective view showing the structure being deployed, some measure being applied to the structure to more easily collapse it.

In the case of the structure shown in FIG. 1, for example, longerons 3 extend like a straight line when the structure is deployed. When this structure is to be collapsed, large load added in the axial direction of the structure is needed to buckle these line-like longerons 3 into a coil. The force of winding pull cord 7 is set large, accordingly. Further, when longerons 3 are to be transformed at their top side, there is a case where they are transformed like a coil not in a desired direction but also in a direction reverse to this desired direction. Furthermore, there is another case where they are buckled at first not at their top side but at their intermediate portion. In this last case, they are twisted like a coil at first at their intermediate portion and the structure becomes therefore extremely unstable while being collapsed. In order to solve this problem, they are previously transformed at their top side into a coil, which has a larger pitch, when the structure is under deployed state, as shown in FIG. 4. When it is arranged like this, however, the structure causes its rigidity to be substantially lowered at its top side.

Figure 5:
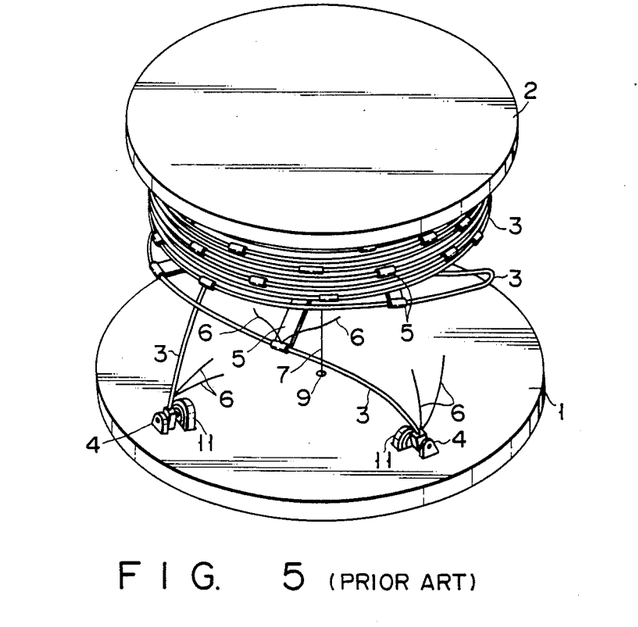
FIG. 5 is a perspective view showing the structure collapsed, said structure being provided with means for enabling the longerons to be erected at their end portions when the structure is deployed.
Figure 6:
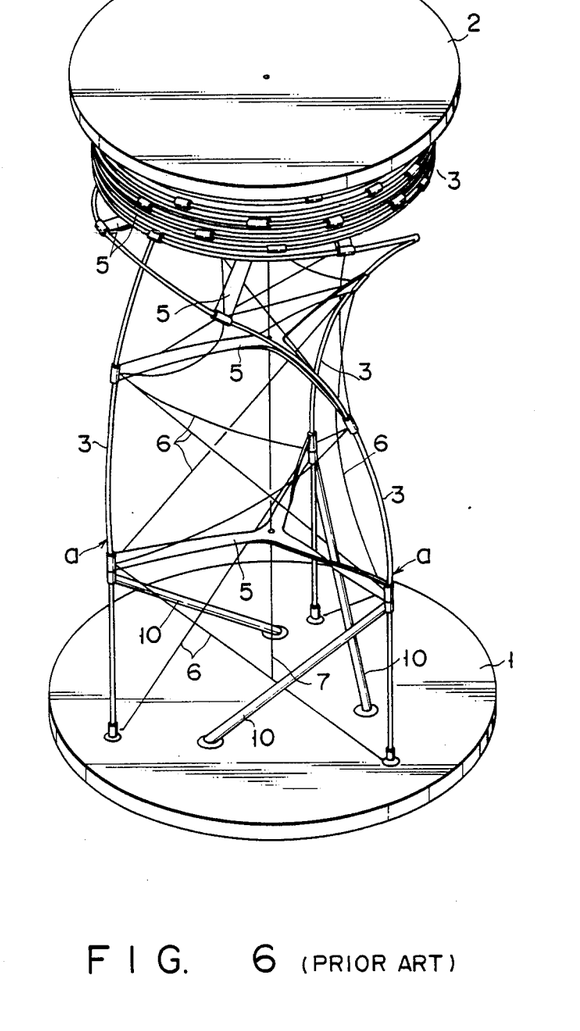
FIG. 6 is a perspective view showing the structure being collapsed, said structure being provided with other means for enabling the longerons to be erected at their end portions when the structure is deployed.

When the structure is to be extended from its collapsed state shown in FIG. 1 to its deployed state shown in FIG. 3, there is a case where longerons 3 are at first erect like a straight line not at their bottom side but at their intermediate portion. In this case, the structure becomes unstable while they are being deployed, as described above. In order to solve this, it is supposed that spiral spring 11 is attached to the bottom end of each of them, as shown in FIG. 5. Torque acting in their erecting direction is thus added to their bottom ends to enable them to erect at first at their bottom side when the structure is deployed. When arranged like this, however, excessive buckling load acts on the respective bottom ends. It is also supposed that the bottom end of each of them is supported by stay 10, holding their bottom end portions previously erected like a straight line, as shown in FIG. 6. However, the structure can be collapsed only to such a state as shown in FIG. 6, so that it occupies a larger space in its axial direction when it is collapsed.

Figure 7:
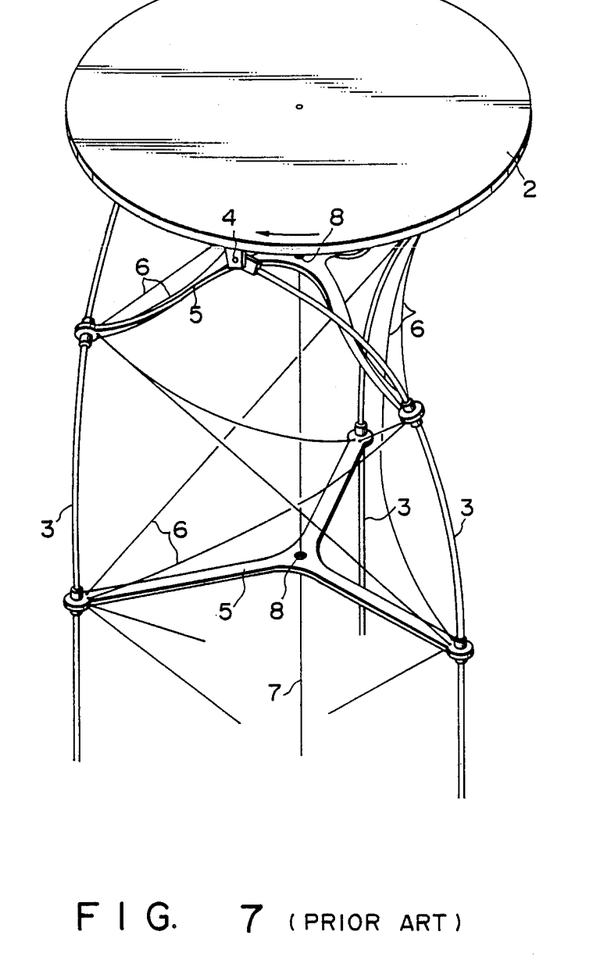
FIG. 7 is a perspective view showing how excessively the radial spacer is transformed at the time when the collapsing of the structure is started.

When the structure is to be collapsed, tension of one of diagonal cords 6 which are stretched like a cross is temporarily increased to a large extent and then relaxed at the initial stage of the coil-like transformation of longerons 3. Both ends of diagonal cord 6 are conventionally attached to foremost ends of the arms of radial spacers 5. Therefore, the increase in the tension of one of diagonal cords 6 caused when longerons 3 are at the initial stage of their being transformed like a coil is absorbed by excessively buckled and transformed arms of radial spacers 5. However, one end of each of diagonal cords 6 is attached to bottom or top plate 1 or 2 at both ends of the structure. These bottom and top plates 1 and 2 are high in rigidity and cannot be transformed easily. It is therefore needed that the excessive tension of diagonal cord 6 caused when longerons 3 are at the initial stage of their being transformed is absorbed by the buckling and transforming of arms of the uppermost or lowest radial spacer. This causes the arms of the uppermost or lowest radial spacer to be excessively buckled and transformed, excessive stress to be added to this radial spacer, and excessive tension to be added to the diagonal cords, as shown in FIG. 7. In order to solve this, it is supposed that those radial spacers which are located at both ends of the structure have a rigidity lower than that of the other radial spacers, but when arranged in this manner, rigidity and strength are lowered at both ends of the structure.

The present invention is therefore intended to provide a deployable and/or collapsible structure capable of eliminating the above-mentioned drawbacks caused when it is under such a transient state that the longerons are being deployed or collapsed but without losing its rigidity and strength when it is in a completely deployed state.

SUMMARY OF THE INVENTION

A first object of the present invention is to easily and stably deploy or collapse the structure.

A second object of the present invention resides in that longerons are transformed like a coil or erected like a straight line at their predetermined end when the structure is to be collapsed or deployed.

A third object of the present invention is to prevent excessive load from acting on longerons, radial spacers and the like.

These objects of the present invention can be achieved by a means which serves to add predetermined tension to one of paired diagonal cords located at both ends of the structure.

According to an embodiment of the present invention, one of the paired diagonal cords stretched like a cross between the uppermost radial spacer and the top plate is freely movably guided, passing through the top plate, and connected to the pull cord. When the pull cord is pulled to collapse the structure, tension acts on the diagonal cords connected to the pull cord and buckling load is thus added to those end portions of the longerons which are located between the uppermost radial spacer and the top plate, so that the longerons can be transformed like a coil at first at their top end portions and then to their lower and lower portions.

According to another embodiment of the present invention, a spring means is connected to the end of each of the longerons at one end of the structure to add load to the ends of the longerons in the peripheral direction of the bottom plate. When the structure is deployed from its collapsed state, the longerons can be erected at first at their bottom end portions due to the load of the springs and then to their upper and upper portions.

According to a further embodiment of the present invention, a spring means is attached to one of the paired diagonal cords stretched like a cross between the uppermost radial spacer and the top plate so as to allow the diagonal cord to be extended. Excessive tension added to the diagonal cord when the longerons are at the initial stage of their being transformed from line-like state to coil-like state at their end portions can be thus absorbed and reduced and excessive load can be prevented from acting on the radial spacer to which the radial spacer is connected.

These and other objects as well as merits of the present invention will become apparent from the following detailed description with reference to the accompanying drawings.

DETAILED DESCRIPTION OF THE PREFERRED EMBODIMENTS

A first embodiment of the present invention is shown in FIGS. 8 through 11. This structure can be more easily collapsed from its deployed state. The fundamental arrangement of this structure is the same as that of the conventional one shown in FIGS. 1 through 3 and the same parts as those in FIGS. 1 through 3 will be denoted by the same numerals. The structure includes three longerons 3 and a plurality of radial spacers arranged at a certain interval along the axial direction of these longerons 3. A pair of diagonal cords are stretched in a cross between the two adjacent longerons and those foremost ends of four arms of the two adjacent radial spacer which are connected to these two adjacent longerons.

Figure 8:
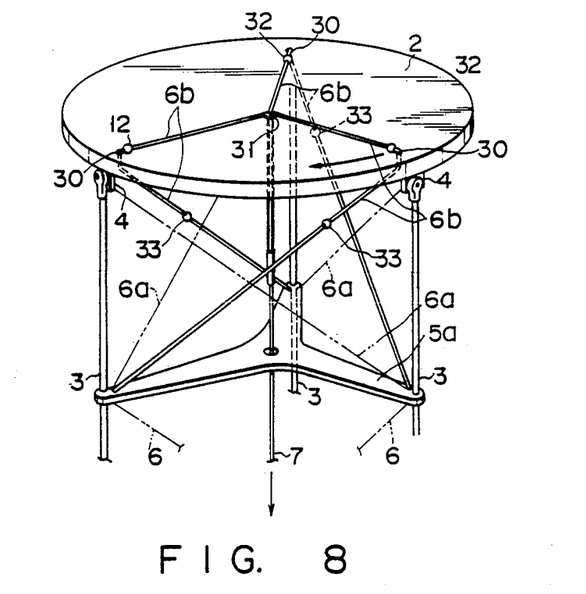
FIG. 8 is a perspective view showing a first example of the structure according to the present invention deployed at one end thereof.

Three guide holes 30 are formed passing through top plate 2 adjacent to hinges 4 thereon. Same guide hole 31 is also formed in the center of top plate 2. The upper end of one of paired diagonal cords 6a and 6b stretched between uppermost radial spacer 5a and top plate 2 is freely slidably passed through guide hole 30, guided onto the upper face of top plate and then passed through center guide hole 31. The remaining two of other paired diagonal cords are similarly guided into center guide hole 31. Three diagonal cords 6b thus slidably passed through center guide hole 31 are then connected to the top of pull cord 7. Upper and lower stoppers 32 and 33 are attached to each of diagonal cords 6b, sandwiching guide hole 30 between them.

Figure 9:
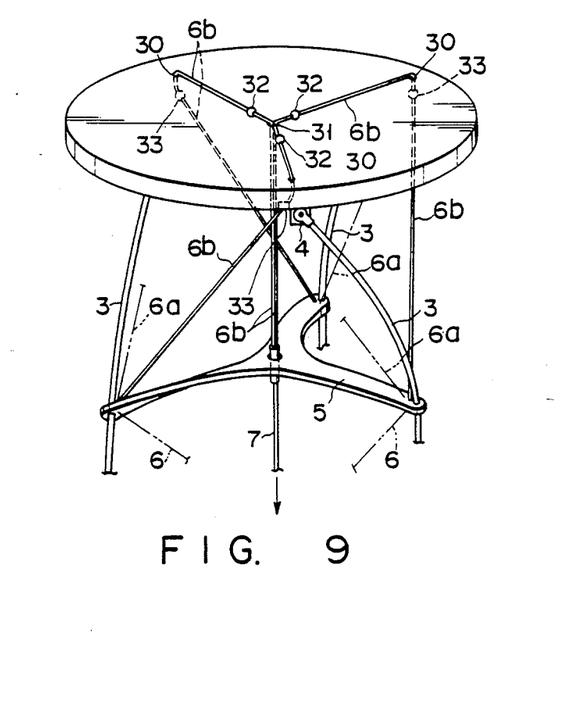
FIG. 9 is a perspective view showing the structure in FIG. 8 at the time when its collapsing is started.
Figure 10:
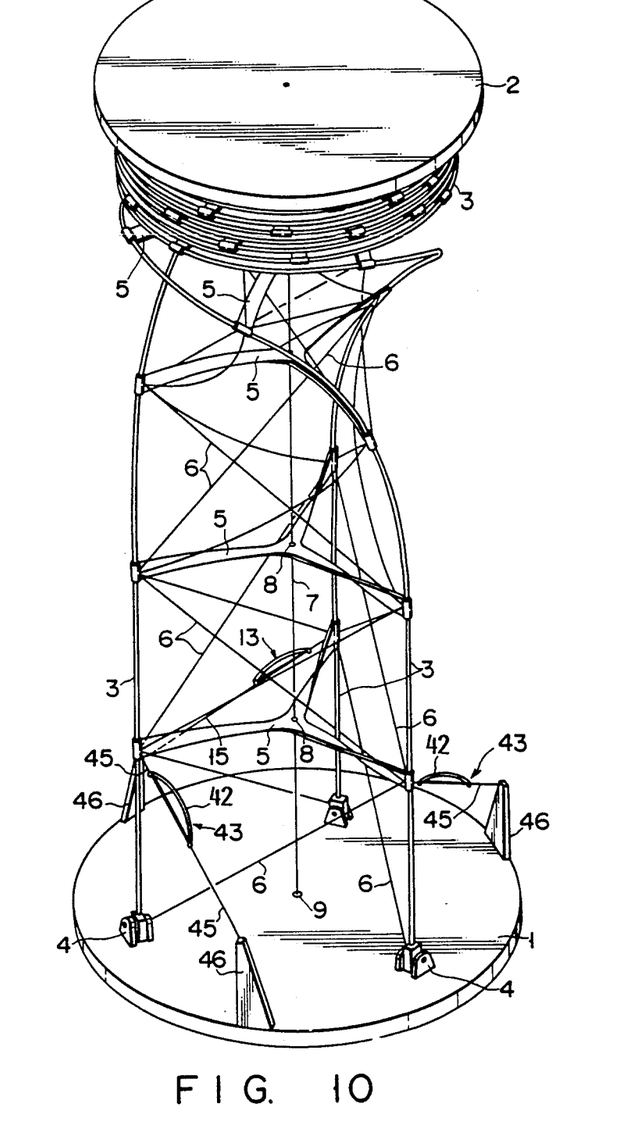
FIG. 10 is a perspective view showing another example of the structure according to the present invention being deployed.
Figure 11:
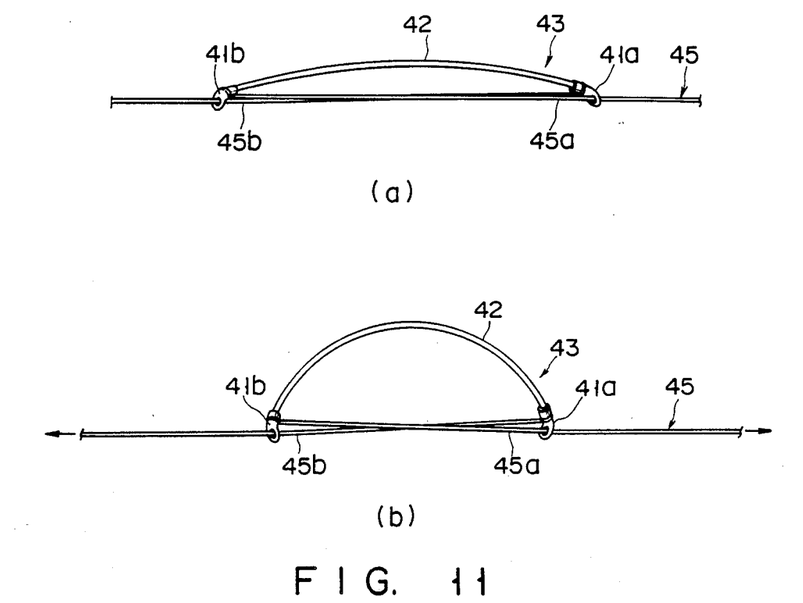
FIGS. 11(a) and 11(b) are perspective view showing a spring means extended and contracted, said spring means being used by the structure in FIG. 10.

When the structure having the above-described arrangement is deployed as shown in FIG. 8, each of longerons 3 extends like a straight line and each of diagonal cords 6a and 6b is stretched to have a predetermined tension. Upper stoppers 32 of diagonal cords 6b are struck against the rims of guide holes 30 under this state to apply the predetermined tension to diagonal cords 6b. When the structure is to be collapsed, pull cord 7 is wound by the winding means (not shown). When pull cord 7 is pulled, tension acts on diagonal cords 6b connected to pull cord 7. These diagonal cords 6b are pulled in a direction oblique to longerons 3 and when tension of each of them is increased, rotation torque is applied to top plate 2 so that those portions of longerons 3 which are located between uppermost radial spacer 5a and top plate 2 are buckled like a coil as shown in FIG. 9. When pull cord 7 and diagonal cords 6b are further pulled and lower stoppers 33 are struck against the rims of guide holes 30 as shown in FIG. 9, top plate 2 is lowered by tension applied from pull cord 7 and longerons 3 are buckled like a coil as seen in the conventional case to thereby collapse the structure. The upper portions of longerons 3 are forcedly buckled like a coil at the time when the collapsing of the structure is started. It is not needed therefore that the force for pulling pull cord 7 is set large at the time of starting collapsing the structure. Further, the end portions of longerons 3 are forcedly buckled and the structure is then collapsed. This enables longerons 3 to be transformed like a coil at first at their top end portions and then to their lower and lower portions. This also prevents longerons 3 from being transformed like a coil at first at their intermediate portions.

FIGS. 10 through 13 show a second example of the structure according to the present invention. According to this second example of the structure, longerons can be certainly erected at their predetermined end portions when the structure is deployed from its collapsed state. The fundamental arrangement of this structure is the same as that of the conventional one shown in FIGS. 1 through 3. The structure also includes three longerons 3 and a plurality of radial spacers 5 arranged at a certain interval along the axial direction of longerons 3. A pair of diagonal cords 6 are stretched in a cross between two adjacent longerons 3 and those four foremost ends of arms of two adjacent radial spacers 5 which are connected to these two adjacent longerons 3. One of paired diagonal cords 6 stretched between lowest radial spacer 5 and bottom plate 1 extends between hinge 4 through which longeron 3 is pivoted on bottom plate 1 and the foremost end of an arm of lowest radial spacer 5. The other diagonal cord 45 is stretched between the foremost end of another arm of lowest radial spacer 5 and the top of post 46. Each of posts 46 is erected, parallel to longerons 3, from bottom plate 1 and positioned outside a circumferential line connecting hinges 4 on bottom plate 1. Spring means 43 is arranged on each of diagonal cords 45 to add a predetermined tension to it and allow it to be freely extensible.

Spring means 43 has such an arrangement as shown in FIGS. 11(a) and 11(b). Numeral 42 denotes a spring member made of epoxy resin reinforced with glass or carbon fibers. Spring member 42 is shaped like a rod and made flexible. Metal fittings 41a and 41b are attached to both ends of spring member 42. Diagonal cord 45 consists of two cords 45a and 45b, one of which is freely slidably passed through one metal fitting 41a at one end of spring member 42 and then fixed to the other end of spring member 42, while the other of which is freely slidably passed through metal fitting 41b at the other end of spring member 42 and then fixed to the one end of this spring member 42. Therefore, cords 45a and 45b are pulled in reverse directions, respectively, due to the elasticity of spring member 42 and a predetermined tension is thus added to diagonal cord 45. When the tension of diagonal cord 45 becomes large, spring member 42 is curved as shown in FIG. 11(b), thereby allowing diagonal cord 45 to be extensible.

Figure 13:
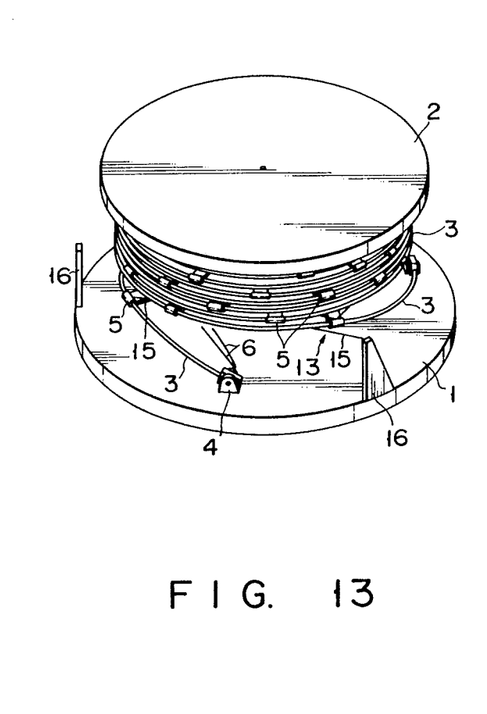
FIG. 13 is a perspective view showing the structure in FIG. 12 collapsed.

The structure having the above-described arrangement can be collapsed when longerons 3 are buckled like a coil as shown in FIG. 13. When the structure is under collapsed state, spring member 42 is curved as shown in FIG. 11(b), keeping diagonal cord 45 extended. When diagonal cords 45 are extended in this manner, longerons 3 are collapsed like a coil from their one end to their other end as shown in FIG. 13. When the structure is to be deployed from its collapsed state, load is added to the lower end portions of longerons 3 in their erecting direction by means of spring means 43, thereby enabling longerons 3 to be erected like a straight line at first at their lower end portions and then to their upper and upper portions.

Figure 12:
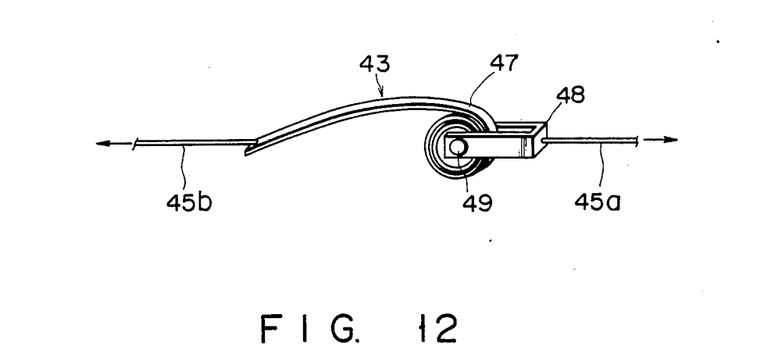
FIG. 12 is a perspective view showing another spring means.

FIG. 12 shows another example of spring means 43. Numeral 47 represents a spiral spring made by forming an elastic strip member into a spiral. One end of this spiral spring 47 is attached to yoke 48 by means of pin 49 in such a way that it can be re-wound when the other end of it is pulled. One cord 45a is connected to yoke 48 while the other cord 45b to the other end of spiral spring 47. When tension is applied to the diagonal cord, spiral spring 47 is re-wound, allowing the diagonal cord to be extended.

Figure 14:
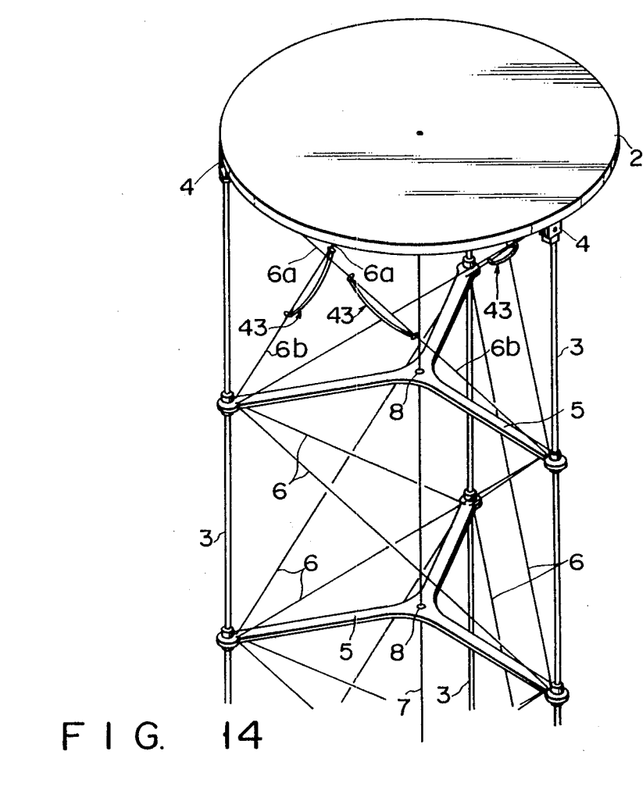
FIG. 14 is a perspective view showing a further example of the structure according to the present invention deployed.
Figure 15:
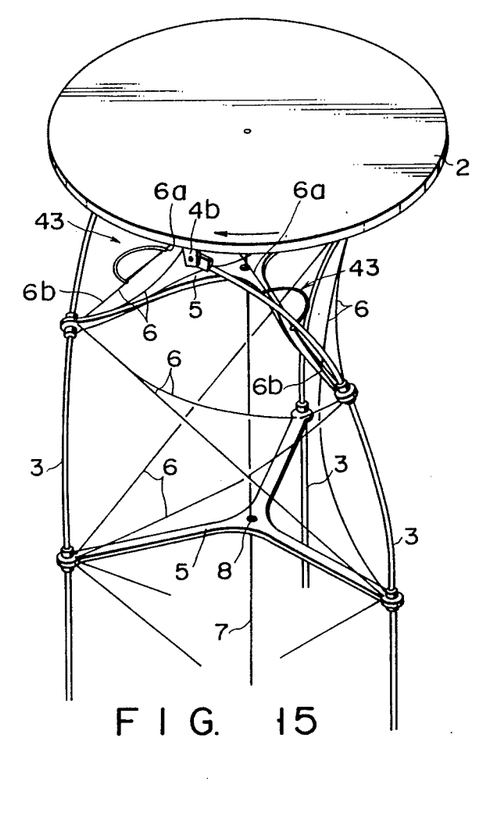
FIG. 15 is a perspective view showing the structure in FIG. 14 at the time when its collapsing is started.

FIGS. 14 and 15 show a third embodiment of the present invention. This embodiment is intended to prevent the uppermost radial spacer from being excessively transformed and force the longerons to be transformed like a coil at their upper end portions only in a predetermined direction. The fundamental arrangement of this embodiment is same as that of the conventional one shown in FIGS. 1 through 3.

Spring means 43 is arranged on one 6b of paired diagonal cords 6a and 6b stretched between top plate 2 and uppermost radial spacer 5, said diagonal cord 6b being more strongly tensioned when lonerons 3 are transformed in a coil at their upper end portions. Spring means 43 may be of the type shown in FIG. 11 or 12.

Figure 16:
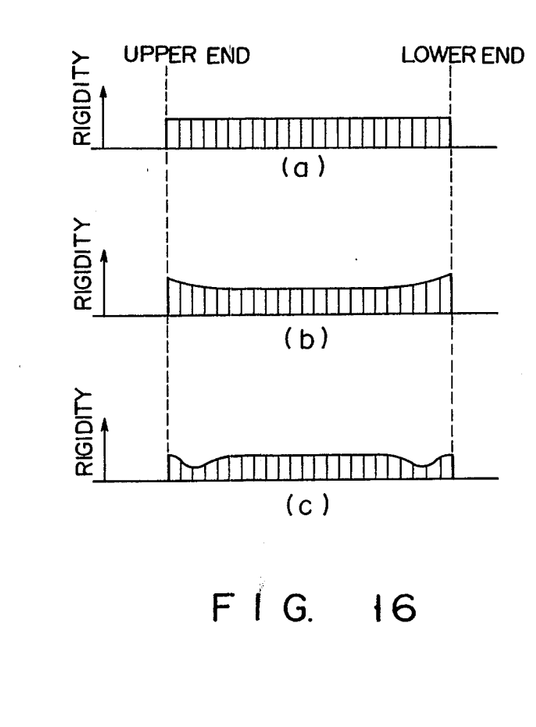
FIG. 16 is a diagram showing the distribution of rigidity all over the structure.

In the case where the structure is to be collapsed from its deployed state, diagonal cord 6b is temporarily tensioned while the other one 6a is relaxed when longerons 3 are transformed like a coil at their upper end portions. This tension increase in diagonal cord 6b is absorbed only by the transforming of uppermost radial spacer 5 in this case because one end of diagonal cords 6a and 6b is attached to top plate 2 which has a higher rigidity. Uppermost radial spacer 5 is thus excessively transformed. In addition, rigidity becomes higher at both end portion of the structure, as shown in FIG. 16(b). This sometimes causes longerons 3 to be transformed like a coil at first at their intermediate portions, transmitting their transformation to their upper and lower portions successively, when the structure is collapsed. In order to prevent the uppermost radial spacer from being damaged by excessive load, it is needed that the rigidity of this radial spacer is made lower than that of the other radial spacers. However, this causes rigidity to be lowered at both ends of the structure as shown in FIG. 16(c).

In the case of the strucutre shown in FIGS. 14 and 15, however, spring means 43 is aranged on each of diagonal cords 6b. Even when longerons 3 are transformed like a coil at their upper end portions, as shown in FIG. 15, upon collapsing the structure, therefore, diagonal cords 6b are sufficiently extended by spring means 43 to absorb tension increase in each of diagonal cords 6b. It is not needed therefore that the rigidity of uppermost radial spacer 5 is set lower than that of the other radial spacers. All of radial spacers 5 can have the same rigidity, accordingly. The structure can be made with the same rigidity all over it, as shown in FIG. 16(a).

The means used by the structure shown in FIGS. 14 and 15 may be applied to the other structures already described above. When spring means 43 is arranged on each of diagonal cords 6a located at the top side of the structure shown in FIGS. 8 and 9, for example, uppermost radial spacer 5 can be prevented from being excessively transformed upon collapsing the structure. In addition, the rigidity of this uppermost radial spacer 5 can be set the same as that of the other radial spacers.

What is claimed is:

1. A deployable and collapsible structure comprising a pair of end plates; plural longerons arranged parallel to one another and elastically buckled, said longerons being pivoted on the end plates at their both ends; a plurality of radial spacers arranged along the axial direction of the longerons equally spaced from their adjacent ones; paired diagonal cords stretched between two adjacent radial spacers, between the lowest radial spacer and its closest end plate, and between the uppermost radial spacer and its closest end plate; and a pull cord connected to at least one of the end plates, one of the pair of end plates being moved toward the other when the pull cord is pulled, while one of the pair of end plates being separated from the other when the pull cord is loosened, and the longerons being buckled like a coil when the end plates approach each other, while the longerons being deployed like a straight line when the end plates separate from each other; and guide means on one of the pair of end plates for freely slidably gliding, relative to said one of the end plates, one end of one cord of each of the paired diagonal cords stretched between said one of the pair of end plates and the radial spacer closest to it, and said one end of each of the diagonal cords guided by said guide members being connected to the top of the pull cord.

* * * * *

UNITED STATES PATENT AND TRADEMARK OFFICE
CERTIFICATE OF CORRECTION

PATENT NO. : 4,918,884
DATED : April 24, 1990
INVENTOR(S) : OKAZAKI et al

It is certified that error appears in the above-identified patent and that said Letters Patent is hereby corrected as shown below:

In the title page, delete the following Foreign Application Priority Data:

May 15, 1987 [JP] Japan.......62-117110
    May 15, 1987 [JP] Japan....... 62-71688
    May 15, 1987 [JP] Japan....... 62-71689

Signed and Sealed this

Nineteenth Day of November, 1991

*Attest:*

HARRY F. MANBECK, JR.

*Attesting Officer*      *Commissioner of Patents and Trademarks*